J. J. De BARRY.

Key-Check.

No. 6,342. Reissued March 23, 1875.

*Witnesses:*

M. Gardner.

A. H. Norris

*Inventor:*

James J. De Barry

By James L. Norris

Atty.

THE GRAPHIC CO. PHOTO-LITH. 39 & 41 PARK PLACE, N.Y.

UNITED STATES PATENT OFFICE.

JAMES J. DE BARRY, OF CHICAGO, ILLINOIS.

IMPROVEMENT IN KEY-CHECKS.

Specification forming part of Letters Patent No. 135,092, dated January 21, 1873; reissue No. 6,342, dated March 23, 1875; application filed September 18, 1873.

*To all whom it may concern:*

Be it known that I, JAMES J. DE BARRY, of Chicago, in the county of Cook, and State of Illinois, have invented certain new and useful Improvements in Key-Checks, of which the following is a specification:

This invention has for its object to furnish a simple and convenient check or appendage to hotel-keys, &c., whereby the movement of the guests can be registered or advertised with ease and facility.

My invention consists in engraving, painting, or otherwise arranging on one of the faces of a metallic disk of any desired form or configuration a series of words, characters, &c., which, in connection with a movable pointer, shall serve as a medium for informing visitors as to the whereabout of the occupant of a room to which the key belongs, while the opposite side of the said disk may possess a dial and similar pointer for indicating the time at which the guest, in cases of temporary absence, is expected to return.

Figure 1:
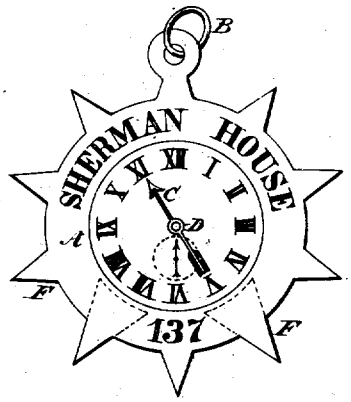
Figure 2:
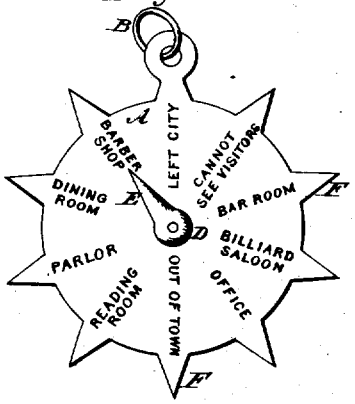

In the drawing, Figure 1 represents a face view of my key-check. Fig. 2 is a similar view of the opposite face of the same; and Fig. 3, a longitudinal sectional view of an improvement in mounting the pointers to permit them to rotate independent of each other.

The metallic disk or plate A constituting a key-check may be of any desired form or configuration, and for attaching the same to a key it is provided with a link-ring or snap-hook, B, or equivalent device. One of the faces of the disk bears an inscription indicative of the name of the hotel, and the number of the check or room to which it belongs. A dial is also formed on the same face of the check in numerical order, either by engraving, painting, or other suitable manner, and in suitable relation thereto is arranged a movable pointer, C, which is susceptible of being rotated on a central axis, D, for causing the index-finger on the same to point to the desired number indicative of the hour at which the occupant of the room is expected to return.

The opposite face of the check or disk possesses a series of words, characters, &c., designating the various resorts which guests of hotels generally frequent, and such other information as may be advisable to impart to visitors.

A movable pointer, E, is employed as a medium for advertising the movements of the guest in case of a temporary absence from his room. The pointers C E are placed loosely on the fixed arbor D, so as to enable the same to be moved freely and independently of each other. For effecting this connection I preferably, by reason of its simplicity, form the arbor D with its ends reduced in diameter, fit the pointers on the same, and then rivet the ends for securing the latter in position.

Figure 3:
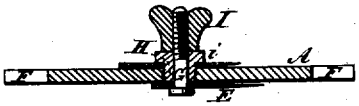

In some instances, to permit the pointers to have an independent and free revolution, I arrange the pointer C upon a hollow bushing, H, having a collar, *i*, and pass the bushing through a central opening in the check, and I then arrange the pointer E upon the headed pin or bolt G, and pass the bolt through the bushing, and secure the whole together by a thumb-nut, I, thus providing a pointer on each side of the check, as clearly shown in Fig. 3 of the drawing, and admitting of the free revolution of either independent of the other. The check or disk is provided with a series of peripheral points or prongs, F, which may either be formed with the disk or be detachably secured to the same by means of dovetail or tapering shanks inserted into corresponding grooves formed in the face of the disk.

The object of said prongs is to render it inconvenient for the check and its attached key to be carried in the pockets of the guest, as by reason of the contact of the prongs with the body it serves as a reminder to deliver the key at the office of the hotel.

From the above description it will be perceived that a simple and effectual medium is furnished, applied to an article which is conspicuously displayed at the office or clerk's desk of a hotel, for imparting the desired information to visitors as to the whereabout and time of return of the person they are seeking, in case he should be absent from his room.

What I claim as my invention, and desire to secure by Letters Patent, is—

A tag or check for keys, having a dial and an indicator on one side and letters or characters and an indicator on the opposite side, substantially as described, for the purpose herein set forth.

In testimony that I claim the foregoing I have hereunto set my hand this 1st day of September, A. D. 1873.

JAMES J. DE BARRY.

Witnesses:
P. A. HOYNE,
NORMAN HALL.